United States Patent Office 2,906,797
Patented Sept. 29, 1959

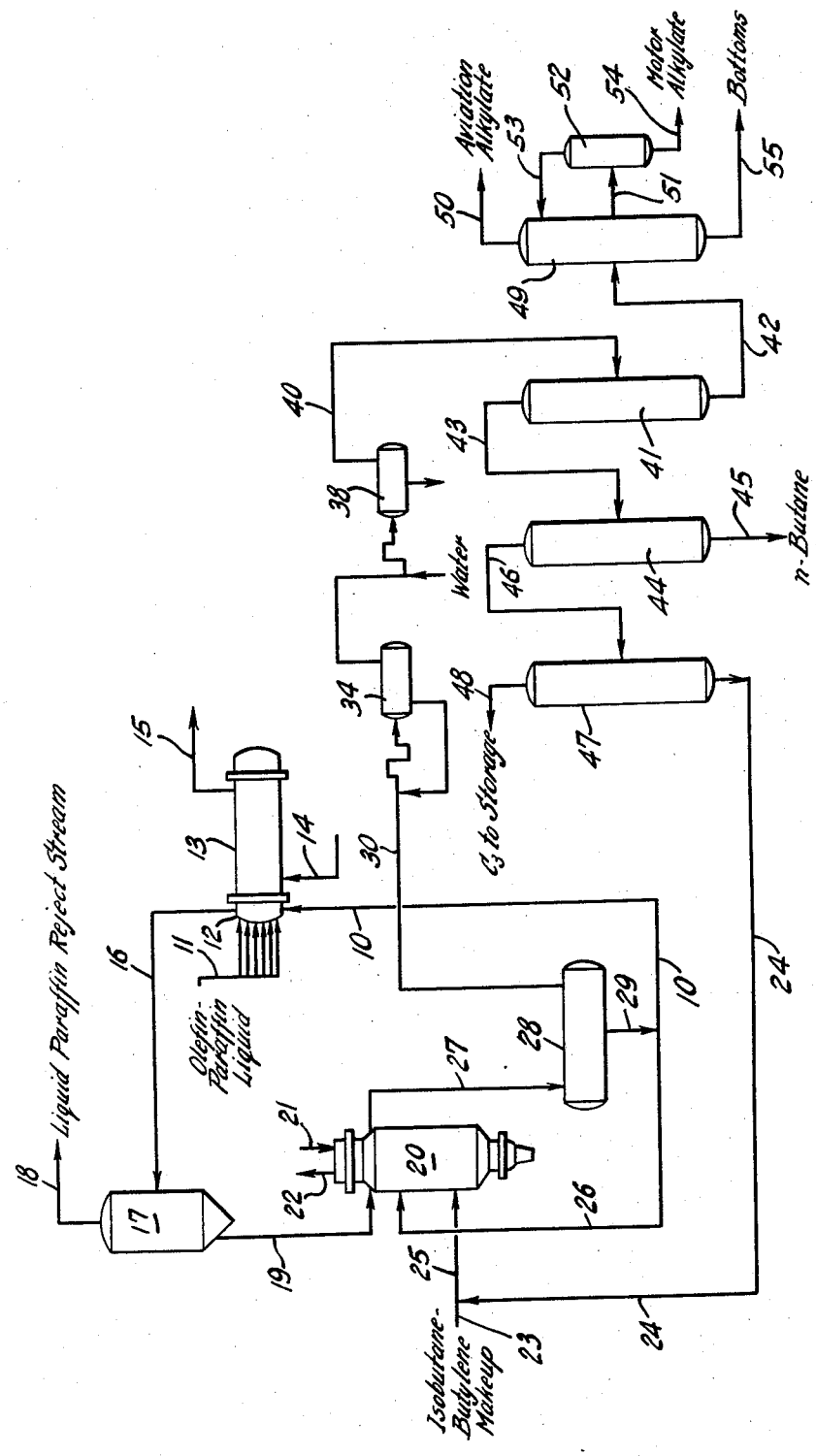

2,906,797

TWO STAGE ALKYLATION PROCESS

David K. Beavon, Darien, Conn., and Frederic H. Moore, Long Beach, Calif., assignors to Texaco Inc., a corporation of Delaware Application April 30, 1957, Serial No. 655,973

5 Claims. (Cl. 260—683.61)

This invention relates to isobutane-olefin alkylation with an acid catalyst, e.g., sulfuric acid, and more particularly to a two-stage alkylation process of this type.

In a two-stage olefin-isobutane alkylation process the first stage broadly comprises absorbing the olefin reactant in recycled acid catalyst, and the second stage broadly comprises contacting the olefin-acid solution with the isoparaffin in an alkylation zone under alkylation conditions. The most satisfactory olefins for the process are of low molecular weight, i.e., propylene and butylene.

Operation of such two-stage alkylation process provides a method for eliminating undesirable contaminants, e.g., paraffins, from the olefin feed before introducing it into the alkylation reaction zone, and for distributing the alkylation refrigeration load on to an additional step. To be practical, the absorption step must not give rise to an excessive amount of degradation products, e.g., olefin polymers. Propylene is especially sensitive to formation of degradation products. Correlative to this, economy dictates that the bulk of the paraffin and only a small amount of the olefin can be rejected, i.e., the absorption must not only be highly selective as to the olefin but also practically complete.

In such two-stage process the acid catalyst employed is customarily sulfuric acid of alkylation strength, e.g., 88–95% by weight $H_2SO_4$, and our invention will be described hereinafter with particular emphasis on sulfuric acid alkylation. However, use of HF, a liquid, non-metallic, acid alkylation catalyst (as is $H_2SO_4$), is also within the contemplation of a two-stage operation.

Heretofore it has been suggested to use a once-through absorption step with as much as 15–30 mols of recycled acid per mol of olefin being fed, and to limit the contact time between the olefin and the acid to an exceedingly short duration (e.g., less than 2 minutes) in an effort to obtain effective olefin absorption while suppressing or preventing undesirable side reactions. By a once-through absorption step is meant one wherein there is no recycle flow of absorber effluent or absorber effluent fraction to the absorber. Alternatively, it has been suggested to recycle separated olefin-acid solution voluminously to the absorption step while maintaining temperature therein no higher than about 30° F. to suppress olefin degradation.

We have now found a combination of first stage conditions permitting olefin absorption for production of a good quality alkylate quite economically and with significantly more latitude in absorbing time and temperature than contemplated for previously proposed systems. Broadly, our absorption step is a once-through, entirely liquid phase operation which comprises passing a stream of the liquid acid catalyst into an indirectly refrigerated olefin absorption zone, injecting into said absorption zone the liquid phase hydrocarbon feed bearing the olefin reactant for alkylation and contaminating paraffins, the contact of the hydrocarbon feed and acid in said absorption zone being sufficiently disperse for maintaining all local temperatures below about 70° F.; maintaining the mol ratio of total olefin fed to acid fed to said absoprtion zone between about 0.6:1 and about 0.9:1, and maintaining the flow conditions in said absorption zone substantially turbulent, i.e., by comparatively high linear liquid velocities, by a multiplicity of changes in flow direction, by a multiplicity of injections of reactant streams, by mechanical agitation, by combinations of these techniques, and the like.

Our preferred absorption apparatus is a shell-and-tube heat exchanger with refrigerant in the shell, acid catalyst flowing through the tubes, and the hydrocarbon feed subdivided to enter tubes from a plurality of injection points. Alternatively, the acid catalyst and hydrocarbon feed can be passed into a mixer having intensive internal circulation and agitation about a refrigerated tube bundle, e.g., a "Stratco Contactor" or the like.

Our combination of conditions in the olefin absorption produces an effluent which is readily and rapidly separable into an "acid phase" (e.g., an aqueous acid solution of alkyl sulfate) and a paraffin reject phase substantially free of olefin. Gravity separation is effective, rapid, simple, and preferred. However, mechanically accelerated separation of the acid phase from the reject paraffin stream can be practiced if desired. The separated acid phase is then subjected to alkylation in an alkylation zone with isobutane under conventional conditions. Because of the rejection of undesired paraffins the subsequent alkylation stage is particularly amenable to being refrigerated with effluent refrigeration. In effluent refrigeration the reaction mixture from the alkylation zone is separated into a liquid hydrocarbon phase and an acid phase. Pressure is then reduced on the separated liquid hydrocarbon phase whereby a portion of it is vaporized with concomitant cooling under substantially adiabatic conditions. The resulting chilled liquid and/or vapor is used to refrigerate the alkylation reaction vessel and such other apparatus as is desirable in the overall alkylation process. The resulting vapor, rich in isobutane, is compressed, condensed, and returned to the alkylation zone to improve alkylation conditions. With effluent refrigeration a desirably high mol ratio of isobutane to all other hydrocarbons can be maintained in the alkylation zone.

Local temperature substantially above 70° F. in our olefin absorption step engenders excessive degradation of the olefin in contact with the alkylation strength sulfuric acid. Advantageously the temperatures in the absorption zone are maintained between about 35° and about 65° F. and preferably between about 40° and about 60° F. for efficiency and economy. Use of temperature of 30° F. and below gives a particularly viscous fat acid effluent which is a problem to pump and to handle, and poor mixing of such acid flow with the hydrocarbon feed is likely to take place.

Particularly critical in the olefin absorbing step is the control of the mol ratio of total olefin fed to sulfuric acid fed. When the olefin/acid mol ratio exceeds about 0.9:1, recovery of substantially all the olefin from the hydrocarbon feed to the absorption zone does not occur and much is lost to the reject hydrocarbon stream; use of an olefin/acid mol ratio substantially below about 0.6:1 gives excessive physical paraffin carryover into the separated olefin/acid phase. Advantageously, for efficiency and economy of the practice of our process, the olefin/acid mol ratio is maintained between about 0.6:1 and 0.8:1.

Maintenance of conditions causing turbulence in the olefin absorption zone, in conjunction with maintenance of the narrow range of olefin/acid mol ratio and temperature below about 70° F., creates a condition whereby practically complete olefin absorption in the acid occurs, and the unreacted olefin escaping into the paraffin reject phase can be kept below about 0.5 volume percent of the total olefin feed. The average time of contact between olefin and acid in our olefin absorbing and separating zones can be as high as 20 minutes (measured as the quotient of the combined volumetric feed rates of hydrocarbon and acid at 60° F. divided by the volume of the equipment concerned) without causing excessive side reactions and olefin degradation. It will be understood, however, that comparatively short contact times between olefin and acid, e.g., 5 to 8 minutes, are preferred to minimize side reactions.

Advantageously, the hydrocarbon feed to the absorption zone of our process consists essentially of propylene and propane in a proportion about 20–80% propylene to 80–20% propane, and preferably propylene will constitute between about 40 and 60% of the hydrocarbon fed to the absorber. Such propylene-propane mixture, as compared to butylene-butane mixtures and highly related hydrocarbon mixtures, are more difficult to fractionally distill with economy for alkylation feed preparation, but are readily handled by our process. While mixtures consisting essentially of $C_{5+}$ olefins and paraffins are amenable to our type of processing, the importance of higher alkylates made from such olefins is not as great as propylene alkylate, the latter being presently in demand for high quality motor fuel.

The invention is illustrated in the attached drawing, a flow diagram of a typical alkylation plant employing an alkylation reaction zone of the internal circulation type, e.g., a "Stratco Contactor." Other reactor types, e.g., the pump and time-tank type, can also be used if desired. While the major pieces of equipment are shown in the singular, e.g., the alkylation reactor, it will be understood that more than one of such pieces of equipment can be installed in place of the single units shown in the drawing. For simplicity and clarity pumps, compressors, condensers, coolers, reflux returns, valves and instruments are omitted from the drawing, but can be inserted where necessary or desirable.

Referring to the drawing, a liquid phase mixture consisting essentially of olefin for alkylation and paraffin contaminant is introduced to the absorbing operation through line 11, and alkylation strength sulfuric acid through line 10. The acid feed enters head 12 of multipass heat exchanger 13 and passes through the tubes thereof. The hydrocarbon feed is subdivided into a plurality of liquid phase streams which are injected in selected passes of the heat exchanger to make disperse contact with the acid. The injection points are distributed sufficiently far apart from each other and the hydrocarbon feed volume at any single point is regulated to preclude establishing local stream temperatures substantially above 70° F. Heat exchanger 13 is chilled by a flow of refrigerant entering the shell side through line 14 and being withdrawn from line 15. The efficiency of refrigerating the acid flow through the exchanger will govern at least in part the proximity with which one hydrocarbon injection point can be located relative to another. The rate of a particular liquid hydrocarbon injection stream is controlled preferably by throttling it relative to the temperature in the immediate zone where it contacts the acid stream, the flow being cut back as such local temperature approaches a desired maximum temperature not substantially above 70° F., e.g., 40–65° F.

The absorber effluent is withdrawn through line 16 and passed into separator 17 wherein it separates by gravity into an upper paraffin reject layer and a lower olefin-acid solution layer (i.e., fat acid). A paraffin reject stream is withdrawn through line 18. The fat acid is withdrawn through line 19 and passed into alkylation contactor 20. This vessel is refrigerated to a temperature below about 70° F. and preferably maintained at about 45–50° F. using a flow of refrigerant entering line 21 and being withdrawn through line 22. Recycle isobutane from line 24 and fresh isobutane makeup containing some butylene from line 23 are charged to contactor 20 through line 25. A recycle flow of sulfuric acid catalyst is admitted to contactor 20 through line 26.

Preferably the sulfuric acid is maintained at about 88–95% strength in the conventional manner, a minor proportion of recycle acid being discarded and fresh stronger makeup acid being introduced from an auxiliary line (not shown in the drawing). It will be understood that the liquid acid/hydrocarbon volume ratio in the contactor constituting the alkylation reaction zone is maintained at about 1:1 and the contact time in the alkylation zone at about 25–45 minutes in conventional manner. The mol ratio of isobutane to olefin supplied to the alkylation zone (including isobutane recycle) is substantially in excess of 1:1, and is generally between about 4:1 and 10:1.

Effluent from reactor 20 is passed by line 27 into settler 28 wherein it is separated under pressure into a liquid hydrocarbon phase and a liquid acid phase. Separated acid phase is tapped from the separator by line 29 and a portion recycled to contactor 20 through line 26 as hereinbefore described. The balance of the separated acid is passed into head 12 of heat exchanger 13 by means of line 10 as hereinbefore described. The rate of acid feed to the heat exchanger through line 10 is sufficient for establishing and maintaining the mol ratio of total olefin fed to sulfuric acid fed to said heat exchanger between about 0.6:1 and 0.9:1.

The liquid hydrocarbon layer from separator 28 passes through conventional caustic and water washing steps indicated generally at 34 and 38, respectively.

Alternatively, the liquid hydrocarbon layer can be used to refrigerate the reactor prior to the caustic and water washing. In such instance pressure on the separated liquid hydrocarbon is reduced to about atmospheric whereby a portion of the hydrocarbon vaporizes and essentially adiabatic cooling of the hydrocarbon results. The chilled liquid and/or vapors so created can be passed into refrigerant inlet 21 of the reactor 20 wherein more vapors result from heat exchange. The resulting liquid-vapor mixture is withdrawn through refrigerant outlet 22. The withdrawn hydrocarbons are separated into a vapor and a liquid phase. The vapor phase is compressed, condensed, depropanized if necessary or desirable, and returned to the alkylation zone. The high isobutane content of such condensed vapors improves alkylation conditions. The liquid fraction or a portion thereof can then be caustic-and-water washed in conventional fashion prior to recovery of alkylate product as hereinafter described.

By means of line 40 the washed hydrocarbon product enters debutanizer tower 41 wherein it is fractionally distilled to obtain a distillate consisting essentially of $C_4$ and lighter hydrocarbons and a bottoms product consisting essentially of heavier hydrocarbons. The overhead vapors are condensed and a portion returned as reflux to tower 41 by means not shown. The balance of the $C_4$ and lighter condensate is passed through line 43 into deisobutanizer 44 wherein fractional distillation takes place to separate essentially all the isobutane and lighter into a distillate product and essentially all the normal butane into a bottoms product. The normal butane fraction is withdrawn through line 45. The overhead vapors are condensed and a portion returned as reflux to tower 44 by means not shown.

The balance of the condensate passes through line 46 into depropanizer 47 and is fractionally distilled into a bottoms fraction consisting essentially of isobutane and a distillate fraction consisting essentially of $C_3$ hydrocarbons. The isobutane fraction is recycled to contactor 20 through lines 24 and 25. The overhead vapors are condensed and a portion returned as reflux to tower 47 by means not shown, and the balance of the $C_3$ condensate is sent to storage for LPG or other use.

Debutanizer bottoms withdrawn through line 42 are fed into tower 49 where fractional distillation of the product alkylate is obtained. The distillate is condensed and a portion returned as reflux to tower 49 by means not shown. The balance is withdrawn through line 50 as an aviation alkylate. A sidestream is withdrawn from an intermediate tray in tower 49 by line 51 and passed into stabilizer 52 wherein it is stripped with steam. The stripped vapors are returned to column 49 by line 53, and motor alkylate product is withdrawn through line 54. The alkylate bottoms are discharged from tower 49 through line 55, cooled, and sent to tankage for cracking stock or other uses.

The foregoing example shows one way in which we have practiced our invention, but should not be construed as limiting it.

Cold, lean sulfuric acid of 88 weight percent strength, separated from alkylation reaction zone effluent by settling as hereinafter described, was fed at pressure of 215 p.s.i.g. and rate of 18.2 bbls./hr. (42-gal. barrels) into the tube side of a 46-pass shell-and-tube heat exchanger chilled with refrigerant on the shell side. The liquid hydrocarbon feed used had the following analysis:

| Hydrocarbons: | Liquid volume percent |
|---|---|
| Ethylene | 0.2 |
| Ethane | 1.6 |
| Propylene | 52.8 |
| Propane | 42.8 |
| Isobutane | 1.7 |
| Butylene | 0.6 |
| n-Butane | 0.3 |

A total of 36 bbls./hr. of the liquid hydrocarbon was injected into the acid stream as follows: 26 bbls./hr. into the 4th pass of the exchanger (point #1); 8 bbls./hr. at the 23rd pass of the exchanger (point #4); and 2 bbls./hr. at the 30th pass of the exchanger (point #5). Local temperatures taken at these points of hydrocarbon injection and other locations throughout the olefin absorption zone were as follows:

| Location | Description | Temperature, °F. |
|---|---|---|
| Point 1 | 4th pass | 60 |
| Point 2 | 11th pass | 58 |
| Point 3 | 16th pass | 68 |
| Point 4 | 23rd pass | 57 |
| Point 5 | 30th pass | 57 |
| Point 6 | 41st pass | 54 |
| Point 7 | Fat acid outlet | 65 |

The superficial linear acid velocity through the exchanger tubes, based on acid flow through the tubes at average exchanger temperature without consideration of the effect of the added hydrocarbons, was about 1.1 feet per second.

Effluent from the heat exchanger was conducted into a settling tank maintained at temperature of 70° F. and pressure of 115 p.s.i.g. A liquid hydrocarbon reject stream, 17.4 bbls./hr., was withdrawn therefrom and fat acid, i.e., propylene-sulfuric acid solution, 36.8 bbls./hr., was withdrawn therefrom for feed into the alkylation operation. The hydrocarbon reject stream had the following analysis:

| Hydrocarbon: | Liquid volume percent |
|---|---|
| Ethane | 0.8 |
| Propylene | 0.4 |
| Propane | 82.7 |
| Isobutane | 3.8 |
| n-Butane | 0.9 |
| $C_{5+}$ | 11.4 |

Average time of contact of olefin with acid from inlet of the heat exchanger to separation in the settling tank was about 15 minutes based on the combined rates of total hydrocarbon and acid feeds to the heat exchanger measured at 60° F. and the equipment volume.

As a second stage the propylene-acid solution was fed into an alkylation operation together with a mixture of fresh isobutane and butylene, some additional propylene feed, recycled isobutane from depropanizer bottoms, and the balance of the sulfuric acid catalyst separated from the reactor effluent as hereinafter described. In the alkylation operation average temperature was maintained at 53° F., liquid volume percentage of isobutane relative to all other hydrocarbons in alkylation (including propylene absorbed in the fat acid) was maintained at approximately 75%, the mol ratio of propylene to butylene feed was 1:1, and the liquid acid/liquid hydrocarbon volume ratio was 1.1:1. The acid strength was maintained at 88 weight percent by withdrawing a spent acid sidestream from sulfuric acid separated from the reactor effluent as hereinafter described and periodically making up with an input stream of fresh acid of 98 weight percent strength. The acid strengths referred to were measured by Baumé hydrometers and periodic laboratory titrations.

Alkylation effluent was separated into an aqueous acid phase and a liquid hydrocarbon phase in an acid settler. The acid was withdrawn from the acid settler and split into two fractions. One fraction was sent to the heat exchanger for olefin absorption as hereinbefore described. The other fraction was recycled to the alkylation reactor after fortification as previously described.

The liquid hydrocarbon phase was caustic treated, water washed, then fractionally distilled in a debutanizer to obtain a $C_4$ and lighter distillate and a bottoms fraction. The $C_4$ and lighter distillate was further fractionally distilled in a deisobutanizer to obtain an isobutane and lighter distillate and a bottoms fraction consisting essentially of normal butane. The isobutane and lighter distillate was further fractionally distilled in a depropanizer to obtain $C_3$ and lighter distillate and a bottoms fraction consisting essentially of isobutane. This bottoms fraction was recycled to the alkylation operation.

The aforesaid debutanizer bottoms fraction was further fractionally distilled into aviation alkylate having boiling point range from 140 to 275° F., motor alkylate having boiling point range from 280 to 430° F., and alkylate bottoms having boiling point range from 430° F. to 600° F. Acid consumption per barrel of aviation plus motor alkylates was 41.6 pounds. The volumetric ratio of aviation alkylate:motor alkylate:alkylate bottoms produced was 79.6:18.1:2.3.

While the foregoing example of plant production operations shows how effective propylene utilization for making high quality motor fuel components can be obtained with our process, it will be understood that use of $C_4$ and higher olefins is also possible.

We have found, for operation of the preferred type of absorption zone maintained within a multipass shell-and-tube heat exchanger having the acid and the hydrocarbon feeds in the tubes and a refrigerant on the shell side, that establishment of a flow velocity for one of the feeds of at least about 0.5 foot per second and preferably of about a foot per second or greater throughout the tubes maintains sufficiently turbulent conditions in the tube runs to prevent any substantial amount of laminar flow or other similar condition which would be conducive to undesirable settling of the catalyst phase away from a hydrocarbon phase. The flow velocity referred to herein is a superficial determination based on the quotient of the gross input rate of one of the absorber feeds measured at average exchanger temperature divided by the cross-section of the tube path through the absorption zone. The effect of the incremental introduction of the other absorber feed is not taken into account in the calculation, but ordinarily will increase the flow velocity advantageously when conventional equipment of substantially constant cross-section is being used.

Additional control of absorption zone conditions within the necessary limits to avoid impractical fluid viscosities on the low temperature side and excessive olefin degradation products and the like on the high temperature side, i.e., below about 35° F. and above about 70° F., can be obtained by precooling either or both of the feeds to the absorption zone, if desired.

We claim:

1. In a two stage olefin-isobutane alkylation process wherein as a first stage a hydrocarbon feed containing a low molecular weight olefin reactant for alkylation and paraffins mixed therewith is contacted with alkylation strength acid catalyst for absorption of the olefin in the acid in a refrigerated absorption zone, the improvement which comprises: passing lean acid catalyst as a liquid phase stream into said absorption zone; injecting the hydrocarbon stream in liquid phase into said stream of acid catalyst at an overall rate adapted to establish and maintain the molar ratio of total olefin fed to acid fed between about 0.6:1 and about 0.9:1, the contact of the acid and hydrocarbon feed in said absorption zone being sufficiently disperse for maintaining all local temperatures therein below about 70° F.; maintaining substantially turbulent liquid phase once-through conditions in the said absorption zone; and withdrawing from said absorption zone an effluent readily separable into an acid phase containing absorbed olefin and a paraffin reject phase substantially free of olefin.

2. The process of claim 1 wherein the acid catalyst is sulfuric acid, and the hydrocarbon stream is injected into said stream of acid catalyst as a plurality of simultaneous flows.

3. The process of claim 1 wherein the hydrocarbon feed consists essentially of propylene and propane, the temperatures in said absorption zone are maintained at about 40–65° F.

4. The process of claim 2 wherein the effluent from said absorption zone is separated into an acid phase and a paraffin reject phase, and said acid phase is alkylated with isobutane under alkylating conditions.

5. The process of claim 2 wherein the stream of sulfuric acid catalyst passes through a tubular absorption zone at a velocity of at least about 0.5 foot per second.

References Cited in the file of this patent

UNITED STATES PATENTS

| | | |
|---|---|---|
| 2,355,460 | Morrell | Aug. 8, 1944 |
| 2,649,486 | Putney | Aug. 18, 1953 |